(12) United States Patent
Hasegawa (10) Patent No.: US 6,494,444 B2
(45) Date of Patent: Dec. 17, 2002

(54) VIBRATION DAMPING DEVICE FOR VEHICLES

(75) Inventor: Koichi Hasegawa, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/796,079

(22) Filed: Feb. 27, 2001

(65) Prior Publication Data

US 2001/0020761 A1 Sep. 13, 2001

(30) Foreign Application Priority Data

Mar. 1, 2000 (JP) ........................................ 2000-055472

(51) Int. Cl.[7] ............................. F16F 15/02; F16M 7/00; B60G 13/16
(52) U.S. Cl. ........................ 267/141; 188/268; 188/378; 267/136; 267/292; 267/153
(58) Field of Search ................................. 267/292, 136, 267/141, 140.11–140.13, 152, 153, 294, 293, 140; 280/124.13; 188/378, 268; 74/574; 248/638, 562, 636, 559; 180/902, 311, 300; 174/42

(56) References Cited

U.S. PATENT DOCUMENTS

| | | |
|---|---|---|
| 2,714,161 A | 7/1955 | Featherstun |
| 3,612,222 A | 10/1971 | Minor |
| 5,156,380 A * | 10/1992 | Cerruti et al. ............... 267/293 |

FOREIGN PATENT DOCUMENTS

| | | |
|---|---|---|
| JP | 125878 | 8/1938 |
| JP | 57-52305 | 3/1982 |
| JP | 64-42591 | 3/1989 |
| JP | 3-86227 | 8/1991 |
| JP | 4-46246 | 4/1992 |
| JP | 9-329182 | 12/1997 |
| WO | WO 00/14429 | 3/2000 |

* cited by examiner

Primary Examiner—Douglas C. Butler
(74) Attorney, Agent, or Firm—Beyer Weaver & Thomas, LLP

(57) ABSTRACT

Vibration damping device for vehicles includes: a rigid housing member having an accommodation space and fixed to a vibrative member; and an independent mass member having a rigid mass body and an elastic body layer bonded on the outer surface of the rigid mass body. The independent mass member is non-adhesively disposed in the accommodation space such that an outer surface of the independent mass member is opposed to the inner surface of the housing member with a predetermined gap distance therebetween, to thereby permit displacement of the independent mass member relative to the housing member. The independent mass member and the housing member is brought into elastic impact against each other, upon application of a vibrational load, at respective abutting surfaces thereof which are opposed to each other in a vibrational input direction.

8 Claims, 6 Drawing Sheets

VIBRATION DAMPING DEVICE FOR VEHICLES

This application is based on Japanese Patent Applications No. 2000-055472 filed Mar. 1, 2000, the contents of which are incorporated hereinto by reference.

BACKGROUND OF THE INVENTION

1. Field of the Invention

The present invention generally relates to a vibration damper installed in a vibrative member of a vehicle, for reducing vibration of the vibrative member. More particularly, the present invention is concerned with such a vibration damper which is novel in construction and which is suitably applicable to vibrative members such as suspension arms, sub frames, body panels, mounting brackets, and vibrative members used in an engine unit or an exhaustion system, so that the vibration damper exhibits an excellent damping effect with respect to vibrations excited in these vibrative members.

2. Description of the Related Art

As vibration damping means for damping or reducing vibration excited in vehicles such as an automotive vehicle, there are known (a) a mass damper wherein a mass member is fixed to a vibrative member, (b) a dynamic damper wherein a mass member is supported by and connected to the vibrative member via a spring member and (c) a damping material, which is a sheet-shaped elastic member and secured to the vibrative member. However, these conventional devices suffer from various potential problems. For example, (a) the mass damper and (b) the dynamic damper both require a relatively large mass of the mass member, and exhibit desired vibration damping effect only to significantly narrow frequency ranges. (c) The damping material suffers from difficulty in stably exhibiting a desired damping effect, since the damping effect of the damping material is likely to vary depending upon the ambient temperature.

The present assignee has been disclosed in International Publication WO 00/14429 a novel vibration damper used for an automotive vehicle, which includes a housing member having an inner space and fixed to the vibrative member, and an independent mass member which is accommodated in a inner space of the housing member without being bonded to the housing member, so that the independent mass member is displaceable or movable relative to the housing member, while being independent of the housing member. In the disclosed vibration damper, the independent mass member is moved into and impact the housing member, upon application of a vibrational load to the damper, whereby the vibration of the vibrative body is effectively reduced or absorbed based on loss or dissipation of energy caused by sliding friction generated between the abutting surfaces of the mass member and the housing member and caused by collision or impact of the independent mass member against the housing member. This proposed vibration damper is capable of exhibiting a high damping effect over a sufficiently wide frequency range of frequency of input vibrations, while having a relatively small mass of the mass member.

In order to stably establish a desired damping effect of the vibration damper disclosed in the above-indicated document, it is required to precisely control a distance of spacing or gap between the abutting surface of the independent mass member and the abutting surface of the housing member, as well as to obtain a sufficient mass of the independent mass member.

In the stage of mass production of the vibration damper to be installed in automotive vehicles, it is important to improve production efficiency of the vibration damper with facility of designing and manufacturing the damper.

SUMMARY OF THE INVENTION

It is therefore an object of this invention to provide an improved vibration damping device for an automotive vehicle, which is capable of exhibiting an improved or stabilized damping capability and an improved production efficiency of the vibration damping device, in comparison with the vibration damper disclosed in the above-indicated document of International Publication WO 00/14429.

The above object may be achieved according to the principle of the present invention, which provides a vibration damping device for damping vibrations of a vibrative member of a vehicle, including: (a) a rigid housing member having an accommodation space, which is fixedly disposed in the vibrative member; and (b) an independent mass member having a rigid mass body and an elastic body layer formed on and bonded to an outer surface of the rigid mass body, the outer surface of the rigid mass body having a configuration different from a configuration of an inner surface of the housing member which defines the accommodation space, the independent mass member being non-adhesively disposed in said accommodation space such that an outer surface of the independent mass member is opposed to the inner surface of the housing member with a predetermined gap distance therebetween, to thereby permit displacement of the independent mass member relative to the housing member, the independent mass member and the housing member being brought into elastic impact against each other, upon application of a vibrational load to the device, at respective abutting surfaces thereof which are opposed to each other in a direction in which said vibrational load is applied, the elastic body layer of the independent mass member having a wall thickness which partially varies so that the abutting surface of the independent mass member has a configuration corresponding to that of the abutting surface of the housing member.

In the vibration damping device constructed according to the present invention, the provision of the elastic body layer formed on the outer surface of the rigid mass body makes it possible to adjust the configuration of the abutting surface of the independent mass member so as to correspond to the configuration of the abutting surface of the housing member. This arrangement permits precisely controlling or adjusting the gap distance between the abutting surfaces of the independent mass member and the housing member, even in the case where the outside configuration of the rigid mass body is different from the configuration of the accommodation space, i.e., the configuration of the inner surface of the housing body which defines the accommodation space. Thus, the vibration-damping device of the present invention can effectively exhibit a desired damping effect. It may be possible that the wall thickness of the elastic body layer is arranged so that the entire outside configuration of the independent mass member corresponds to the entire configuration of the accommodation space.

In the vibration-damping device of the present invention, the rigid mass body can be designed and manufactured without the configuration of the housing member taken into account, and vice versa. For instance, the present vibration damping device may employ the rigid mass body having a simple configuration including a cylindrical rod shape and a flat-plate shape, even if the housing member has a complicated configuration so as to meet various kinds of requirements, resulting in an improved degree of freedom in designing or manufacturing the rigid mass body and the housing member.

The rigid mass body may be made of a high gravity material, such as iron, making it possible to effectively obtain the mass body which is made compact in size and which has a sufficiently large mass. While the mass body formed of the rigid material generally suffers from difficulty in processing or machining thereof, the present invention does not require processing the shape of the mass body precisely. Namely, the wall thickness of the elastic body layer formed on the rigid mass body is suitably changed so that the configuration of the abutting surface of the independent mass member corresponds to the configuration of the abutting surface of the housing member. Thus, the present vibration-damping device assures a high dimensional accuracy and improved production efficiency of the independent mass member.

The housing member may be made of metallic materials such as iron or an aluminum alloy, or a synthetic resin material, for example. Preferably, the housing member may be formed of a rigid material having a modulus of elasticity of $5 \times 10^3$ MPa or more so as to establish a required hardness enough to support the independent mass member and a desired damping effect. The rigid mass body may preferably be formed of metallic materials, such as iron, in view of their high processability. In order to assure an improved damping effect of the present vibration damping device and a reduced impact noise upon impact of the independent mass member with the housing member, the elastic body layer formed on and bonded to the outer surface of the rigid mass body may preferably have a Shore D hardness of 80 or lower, more preferably, within a range of 20–40, as measured in accordance with ASTM method D-2240. For the above-mentioned improved damping effect and the reduced impact noise, the elastic body layer is also arranged to have a modulus of elasticity within a range of $1-10^4$ MPa, more preferably, $1-10^3$ MPa, and a loss tangent is not less than $10^{-3}$, more preferably within a range of 0.01–10, preferably.

In the present invention, the housing member may be made of a rigid material such as a synthetic material, which has a modulus of elasticity within a range of $5 \times 10^3 - 5 \times 10^4$ MPa, for example, resulting in a minimized impact noise and an ease of tuning of damping characteristics of the vibration-damping device. In the case where the housing member has a relatively low rigidity, the elastic body layer formed on the housing member may be suitably arranged to have a modulus of elasticity which is made smaller than that of the housing member. More preferably, the modulus of elasticity of the elastic body layer is held within a range of $1-10^2$ MPa. This arrangement makes it possible to assure a desired strength and durability of the housing member, and to improve a damping effect of the vibration-damping device with respect to low frequency vibrations, for example.

For effectively establishing further improved damping effect of the vibration damping device of the present invention, the gap distance between the abutting, surface of the independent mass member and the abutting surface of the housing member, namely, between the outer surface of the elastic body layer and the inner surface of the housing member which defines the accommodation space, is preferably arranged to be held within a range of 0.05–0.8 mm. Accordingly, the independent mass member may be reciprocally movable by a distance of 0.1–1.6 mm between two abutting surfaces of the housing member which are opposed to each other with the independent mass member therebetween, in the direction in which the vibrational load is applied to the vibration-damping device. In order to assure or excite the desired and repeated free displacement or bouncing movement of the independent mass member relative to the housing member, upon application of the vibrational load to the device, the mass of the independent mass member, i.e., the total mass of the rigid mass body and the elastic body layer, may be held within a range of 5–10% of the mass of the vibrative member, whereby the independent mass member moves into and impact the housing member and damps the vibrations excited in the vibrative member.

BRIEF DESCRIPTION OF THE DRAWINGS

The above and other objects, features advantages and technical and industrial significance of the present invention will be better understood by reading the following detailed description of the presently preferred embodiments or modes of the invention when considered in connection with the accompanying drawings in which.

DETAILED DESCRIPTION OF THE PREFERRED EMBODIMENTS

Figure 1:
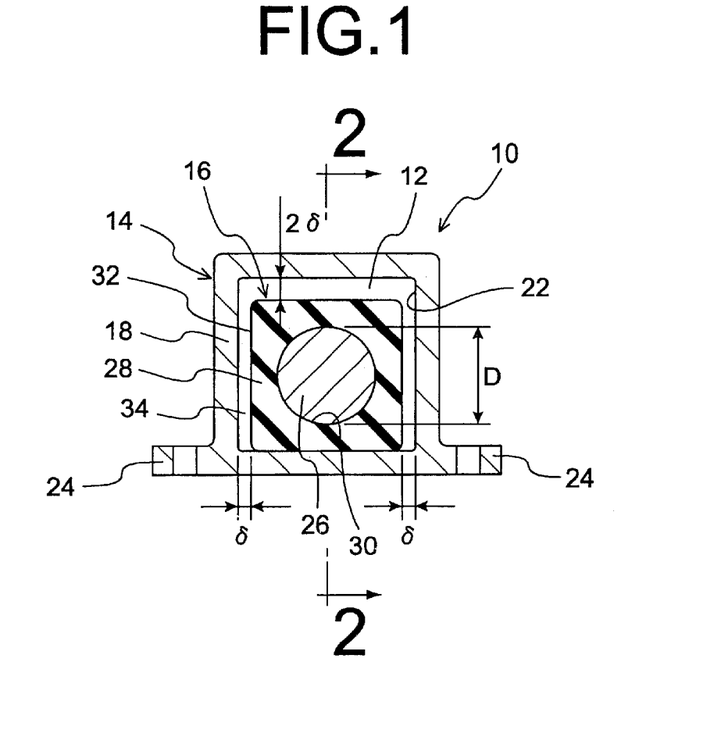
FIG. 1 is an elevational view in transverse cross section of a vibration damper for automotive vehicles, constructed according to a first embodiment of the present invention.
Figure 2:
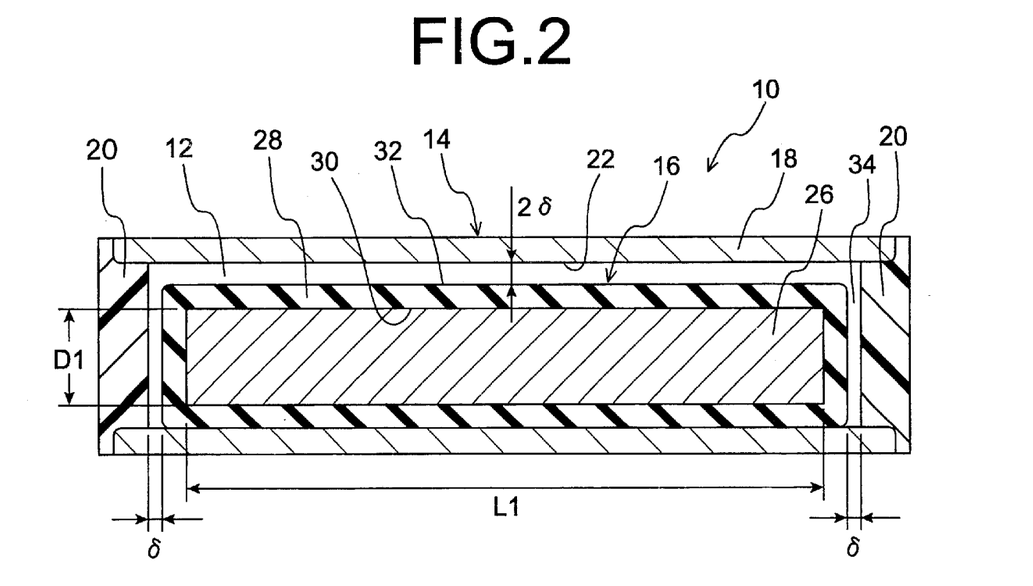
FIG. 2 is a cross sectional view taken along line 2—2 of FIG. 1.

Referring first to FIGS. 1 and 2, there is shown a vibration damper 10 constructed according to a first embodiment of the present invention. The vibration damper 10 includes a housing member 14 having an interior space 12 as an accommodation space, and an independent mass member 16 which is accommodated within the interior space 12. The vibration damper 10 is installed in an automotive vehicle such that the housing member 14 is firmly fixed to a vibrative member such as a body of the automotive vehicle (not shown), which excites vibrations to be damped. With the vibration damper 10 installed in position, the vibration damper 10 exhibits an excellent damping effect with respect to input vibrations which are applied primarily in two directions which are perpendicular to an axial direction of the damper (vertical and horizontal directions as viewed in FIG. 1) in which the housing and the mass members 14, 16 are opposed to each other.

The housing member 14 includes a housing body 18 and cover members 20, 20 fixed to the longitudinally opposite end face of the housing body 18. The housing body 18 is a generally rectangular pipe member extending straightly with a substantially constant rectangular-flame-body shape in cross section. The housing body 18 includes a bore 22 extending therethrough with a constant rectangular cross sectional shape over its axial or longitudinal direction. The housing body 18 also includes a pair of fixing plates 24, 24 integrally formed at the opposite sides of the bottom plate of the housing body 18 as seen in FIG. 1, respectively. Each of the fixing plates 24, 24 extends over the entire longitudinal length of the housing body 18.

Each of the cover, members 20, 20 is a rectangular plate member and is fixed to the corresponding one of the opposite open ends of the housing body 18, by a suitable methods, e.g., by a pressing or a welding operation, or by a suitable fastening means, e.g., bolts or screws. With the opposite open ends of the housing body 18 being closed by the respective cover members 20, 20, the interior space 12 is formed within the housing member 14, which space is separate from the outside of the housing member 14. The thus constructed housing member 14 is fixed at its fixing plates 24, 24 to the vibrative member, by a mounting bolt (not shown) screwed in mounting holes formed through the fixing plates 24, 24.

The housing body 18 of the housing member 14 is formed of a rigid material having a modulus of elasticity of $5 \times 10^3$ MPa or more so that the housing body 18 is oscillated substantially integrally with the vibrative member. For instance, the housing body 18 may be formed by extruding an aluminum alloy. The cover members 20, 20 of the housing member are formed of rigid resin materials or metallic materials.

On the other hand, the independent mass member 16 includes a metallic mass 26 and a rubber elastic body layer 28 disposed on and bonded to the outer surface of the metallic mass 26. The metallic mass 26 is a solid cylindrical rod member extending straightly with a generally constant circular cross sectional shape. The metallic mass 26 has a diameter: D1 which is made smaller than the dimensions of the interior space 12 in the directions perpendicular to the axial direction. The metallic mass 26 has an axial length: L1 which is made smaller than the dimension of the interior space 12 in the axial or longitudinal direction. The metallic mass 26 may be formed by extruding a metallic material such as steel.

The rubber elastic body layer 28 is formed on the outer surface of the metallic mass 26 so that the rubber elastic body layer 28 covers the entire area of the outer surface of the metallic mass 26. The rubber elastic body layer 28 has a wall thickness the value of which is varied in the circumferential direction as measured in a transverse cross section thereof, as shown in FIG. 1. Therefore, the rubber elastic body layer 28 has an inner circumferential surface 30 whose configuration corresponds to that of the outer circumferential surface of the metallic mass 26, i.e., a cylindrical shape, while having an outer surface 32 whose configuration corresponds to that of the bore 22 defined by the inner surface of housing body 18, i.e., a rectangular block shape. It is noted that the inner diameter of the rubber elastic body layer 30 is substantially identical with the diameter of the metallic mass 26, so that the inner circumferential surface 30 of the rubber elastic body layer 28 is closely contact with and fixed to the outer circumferential surface of the metallic mass 26 over the entire area of the outer circumferential surface of the metallic mass 26. Further, the outer surface 32 of the rubber elastic body layer 28 has a configuration which is similar to and slightly smaller than the configuration of the bore 22 defined by the inner surface of the housing body 18. The rubber elastic body layer 28 also extends over and is secured to axially opposite end faces of the metallic mass 26 with a generally constant thickness such that axially opposite end faces of the rubber elastic body layer 28 have respective configuration which correspond to those of the inner surfaces of the cover members 20, 20, i.e., a plane surface.

In the present embodiment, the outer surface 32 of the rubber elastic body layer 28 serves as the abutting surface of the independent mass member, while the inner surface of the hosing body 18 which partially define the interior space 12 serves as the abutting surface of the housing member 14.

The independent mass member 16 is further arranged to have a total mass of the metallic mass 26 and the rubber elastic body layer 28, which is held within a range of 5–10% of the mass of the vibrative member whose vibrations to be damped. The rubber elastic body layer 28 has a Shore D hardness of 80 or smaller, more preferably within a range of 20–40, as measured in accordance with ASTM method D-2240. The rubber elastic body layer 28 has a modulus of elasticity within a range of $1-10^4$ MPa, more preferably, $1-10^3$ MPa, and a loss tangent is not less than $10^{-3}$, more preferably within a range of 0.01–10, preferably.

The thus constructed independent mass member 16 may be formed as follow. Initially the previously formed metallic mass 26 is placed in position in a mold cavity of a mold designed for molding the rubber elastic body layer 28. A suitable rubber material is injected into the mold cavity to fill the mold cavity with the rubber material. The rubber material filling the mold cavity is then vulcanized and is bonded to the metallic mass 26 simultaneously, whereby the independent mass member 16 is provided as an integrally vulcanized product.

The obtained independent mass member 16 is installed within the bore 22 of the housing body 18 and then the cover members 20, 20 are fixed to and close the axially opposite open ends of the housing body 18, respectively, whereby is provided the vibration damper 10 constructed according to the present embodiment, wherein the independent mass member 16 is accommodated within the interior space 12 of the housing member 14.

In the vibration damper 10 constructed as described above, the independent mass member 16 is accommodated within the interior space 12 of the housing member 14 such that the mass member 16 is independent of the housing member 14, and is not adhesive to or bonded to the housing member 14. That is, the mass member 16 is independently movable or displaceable relative to the housing member 14. Since the outside configuration of the independent mass member 16 is made similar to and slightly smaller than the configuration of the accommodation space 12 defined by the inner surface of the housing member 14, the outer surface of the independent mass member 16: and inner surface of the housing member 14 can be spaced apart from each other with a spacing 34 therebetween. Namely, the independent mass member 16 is reciprocally movable or displaceable by a distance: 2 δ of the spacing 34, between the upper and lower or the right-side and left-side surfaces of the housing member 14 juxtaposed with the independent mass member 16 therebetween, as seen in FIG. 1. It is noted that the upper and lower surfaces or the right side and left-side surfaces of the housing member 14 serve as at least two abutting surfaces of the housing member 14. For assuring a desired damping effect of the vibration damper 10, the distance:2 δ of the spacing 34 is preferably held within a range of 0.1–1.6 mm, more preferably, within a range of 0.1–1.0 mm, in the present embodiment. With the mass member 16 being located in the central portion of the interior space 12, the mass member 16 and the interior space 12 are opposed to each other with a gap distance: δ(δ=0.05–0.8 mm, more preferably 0.05–0.5 mm), namely a half of the distance:2 δ of the spacing 34 therebetween, over the entire surfaces thereof. In the static state of the vibration damper 10 shown in FIGS. 1 and 2, where the housing member 14 is not subjected to the vibration of the vibrative body, the independent mass member 16 is held in contact with the lower surface of the interior space 12 due to gravity acted thereto, and are spaced apart from the upper surface of the interior surface 12 with the predetermined spacing 34 having the distance of 2 δ therebetween.

The vibration damper 10 constructed as described above is installed in the vehicle such that the housing body 18 is fixedly bolted to the vibrative member. Preferably, the vibration damper 10 is fixed to a portion of the vibrative member where amplitude of the vibration to be damped is maximized. With the vibration damper 10 installed in position, a vibrational load is applied to the damper 10 primarily in the vertical and horizontal directions as viewed in FIG. 1. The independent mass member 16 is forced to independently move or displace relative to the housing member 14 in the vibration input directions such that the mass member 16 bounces up and down or from side to side between two pairs of opposite abutting surfaces of the housing member juxtaposed with the mass member 16 therebetween in the respective vibration input directions, whereby the independent mass member 16 moves into and impact the housing body 18 at the outer surface of the rubber elastic body layer 28 thereof. In other words, the metallic mass 26 moves into and elastically impacts the housing body 18 via the rubber: elastic body layer 28 interposed therebetween.

Such a repeated bouncing movement of the independent mass member 16 between the abutting surfaces of the housing member 14 applies impact energy to the housing member 14 repeatedly. On the basis of effects of sliding friction and impact generated upon impact or collision of the abutting surface of the mass member 16 with the abutting surface of the housing member 14, the vibration energy excited in the vibrative member is effectively offset or absorbed, resulting in excellent damping effects of the vibration damper 10. It is noted that the damping effect of the vibration damper 10 does not depends only on resonance effects thereof, whereby the vibration damper 10 can exhibit an excellent damping effect with respect to the input vibrations over a wide frequency range, with the mass member whose mass is sufficiently smaller than that of a mass used in a conventional dynamic damper. Further, the vibration damper 10 of the present embodiment is less likely to be sensitive to change in ambient temperature, thereby exhibiting desired damping effects with high stability.

According to the vibration damper 10 of the present embodiment, the outside configuration of the mass member can be suitably arranged to correspond to the configuration of the interior space 12 of the housing member 14, by changing the configuration of the rubber elastic body layer 28 formed on and secured to the outer surface of the metallic mass 26. This makes it possible to employ a simple-shaped member, e.g., a cylindrical rod member as the metallic mass 26, irrespective of the configuration of the interior space 12, facilitating production of the mass member 16 and the vibration damper 10.

Further, the presence of the rubber elastic body layer 28 permits to assure a desired dimensional accuracy of the independent mass member 16, irrespective of the configuration or the degree of dimensional accuracy of the metallic mass 26. This advantage makes it possible to precisely and easily control the gap distance: 6 between the outer surface of the mass member 16 and the inner surface of the housing member 14, whereby the vibration damper 10 can exhibit a desired damping effect with high stability.

The use of the metallic mass 26 made of a high gravity metallic material and embedded in the independent mass member 16, facilitates to provide the mass member 16 which is made compact in size and which has a sufficiently large mass, in comparison with a independent mass member which is entirely made of an elastic body layer.

Figure 3:
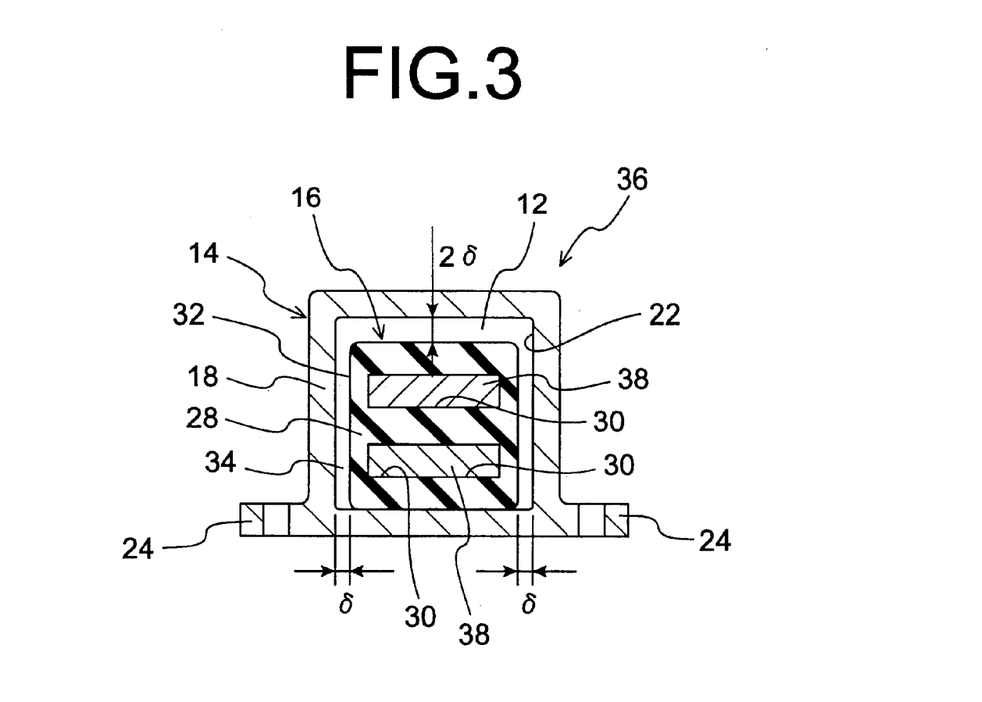
FIG. 3 is an elevational view in transverse cross section of a vibration damper for automotive vehicles, constructed according to a second embodiment of the present invention.
Figure 4:
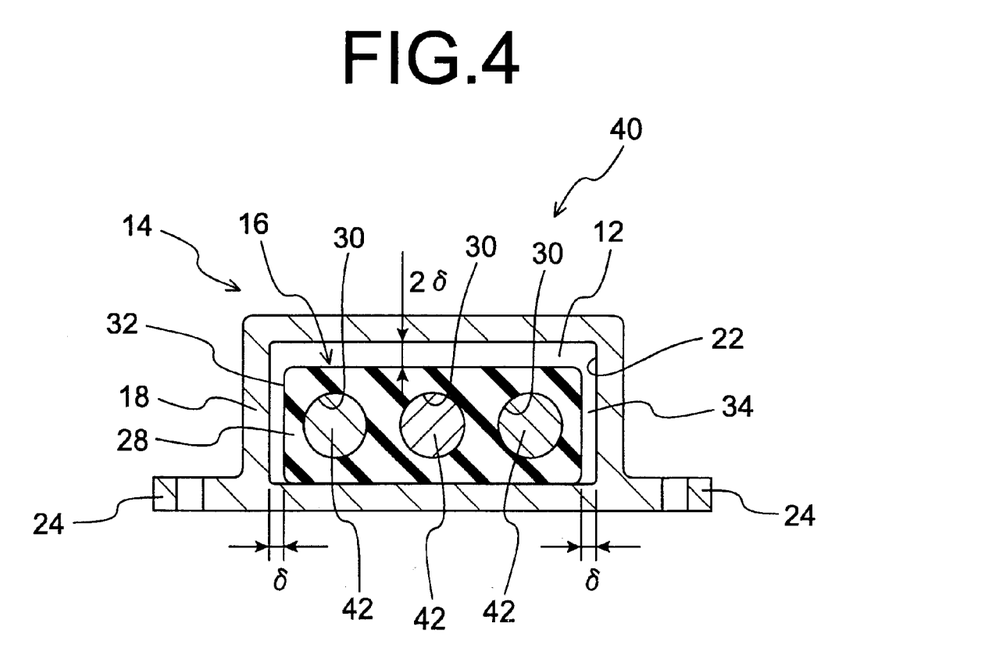
FIG. 4 is an elevational view in transverse cross section of a vibration damper for automotive vehicles, constructed according to a third embodiment of the present invention.

Referring next to FIGS. 3 and 4, there are shown a vibration damper 36 for an automotive vehicle constructed according to a second embodiment of the present invention, and a vibration damper 40 for an automotive vehicle constructed according to a third embodiment of the present invention, respectively. In the following embodiments, the reference numerals used in the preceding embodiment will be used to identify the structurally or functionally identical or corresponding elements, and redundant description of these elements will not be provided, in the interest of brevity and simplification of the description.

As shown in FIG. 3, the vibration damper 36 constructed according to the second embodiment of the present invention is different from the vibration damper 10 in that the mass member 16 includes two metallic masses 38, 38 embedded therein. Each of the two metallic masses 38, 38 is a flat-plate member having a rectangular cross sectional shape which s substantially constant over its longitudinal length, and formed of a metallic material such as steel by pressing. The two metallic masses 38, 38 are arranged in the vertical direction with a given vertical spacing therebetween, while each mass member 38 has a horizontal attitude. The rubber elastic body layer 28 is formed on and bonded to the entire surfaces of the two metallic masses 38, 38, so that the metallic masses 38, 38 are embedded in and covered by the rubber elastic body layer 28.

As shown in FIG. 4, the vibration damper 40 constructed according to the third embodiment of the present invention is different from the vibration damper 10 in that the housing member 14 and the interior space 12 of the housing member 14 are made flat, and the independent mass member 16 includes three metallic masses 42, 42, 42 embedded therein. Each of the three metallic masses 42, 42, 42 is a solid cylindrical rod member having a circular cross sectional shape which is substantially constant over its axial length, and formed of a metallic material such as steel by extruding. The three metallic masses 42, 42, 42 are arranged such that the metallic masses 42 are juxtaposed and spaced apart from each other in the direction perpendicular to the longitudinal direction of the mass member 16. The rubber elastic body layer 28 is formed on and bonded to the entire surfaces of the two metallic masses 42, 42, 42, so that the metallic masses 42, 42, 42 are embedded in and covered by the rubber elastic body layer 28.

In the second and third embodiments of the present invention, a plurality of small-sized metallic masses 38 or 42 are integrally bonded to and embedded within the rubber elastic body layer 28, to thereby provide the independent mass member 16 in the form of an integrally vulcanized product. While the configuration of each of the plurality of metallic masses 38 or 42 is different from the configuration of the interior space 12 of the housing member, the configuration of the outer surface of the rubber elastic body layer 28 is precisely arranged to correspond to the configuration of the interior space 12 (i.e., the inner surface of the housing member 14), and to be slightly smaller than that of the interior space 12.

In the vibration dampers 36, 40 constructed according to the second and third embodiments, the independent mass member 16 can be formed with a configuration highly precisely corresponding to the configuration of the interior surface 12, and with a overall size precisely dimensioned to be slightly smaller than that of the interior space 12, even in the case the :configurations of the plurality of metallic masses 38 or 42 are different from the configuration of the interior space 12. This advantage makes it possible to precisely and easily control the gap distance: δ between the outer surface of the mass member 16 and the inner surface of the housing member 14, whereby the vibration dampers 36, 40 can exhibit a high damping effect with high stability, like the vibration damper 10 constructed according to the first embodiment.

Particularly, the independent mass member 16 is partially constituted by the plurality of small-sized metallic masses 38 or 42 in the vibration damper 36 or 40. Therefore, the independent mass member 16 is capable of easily adapting its configuration to the configuration of the interior space 12 of the housing member 14, without changing the configuration of the each metallic mass 38 or 42, even if the interior space 12 has a complicated configuration.

Figure 5:
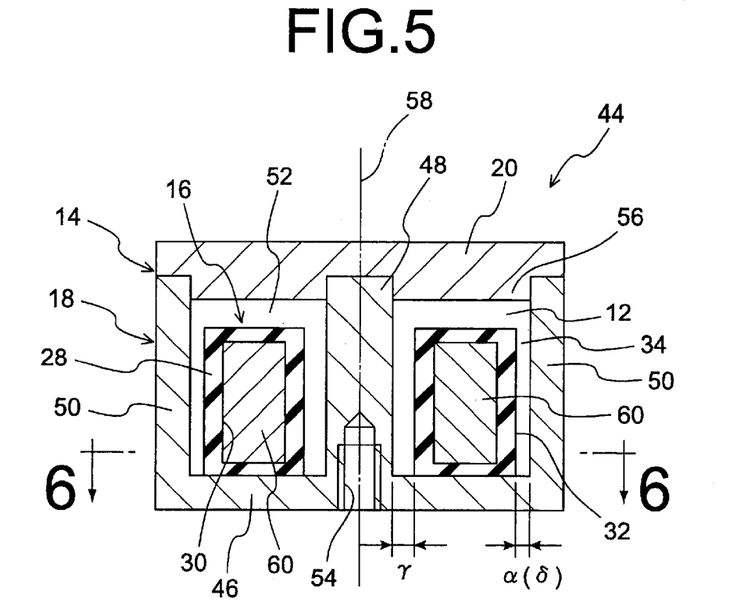
FIG. 5 is an elevational view in transverse cross section of a vibration damper for automotive vehicles, constructed according to a fourth embodiment of the present invention.
Figure 6:
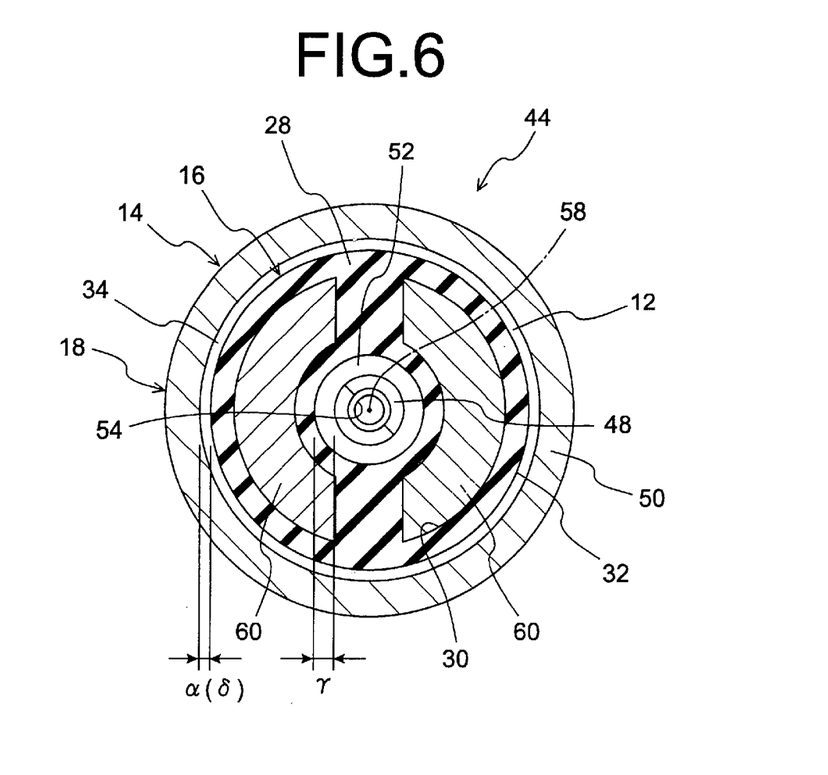
FIG. 6 is a cross sectional view taken along line 6—6 of FIG. 5.

Referring next to FIGS. 5 and 6, there is shown a vibration damper 44 for an automotive vehicle, constructed according to a fourth embodiment of the present invention. The vibration damper 44 includes a housing member 14 having an interior space 12, and a mass member 16 accommodated within the interior space 12. The vibration damper 44 is installed in a vibrative member of the vehicle such that the housing member 14 is fixed to the vibrative member.

Described more specifically, the housing member 14 includes the housing body 18 and the cover member 20, which are made of rigid materials such as an aluminum alloy and iron. In this embodiment, the housing body 18 is a generally cylindrical block member having an annular groove 52 open in one of axially opposite end faces (i.e., upper end face as viewed in FIG. 5). In this arrangement, the housing body 18 includes a disk-shaped bottom wall portion 46, a cylindrical-rod shaped center shaft portion 48 integrally formed with and protruding axially outwardly from a central portion of the bottom wall portion 46, and a hollow-cylindrical shaped outer wall portion 50 integrally formed with and protruding axially outwardly from a peripheral portion of the bottom wall portion 46. That is, the center shaft portion 48 and the outer wall portion 50 are opposed to each other in the radial direction to partially define therebetween the annular groove 52. The center shaft portion 48 includes a threaded hole 54 open in the other one of the axially opposite end faces (i.e., lower end face as viewed in FIG. 5) of the housing body 18. The housing member 14 is firmly fixed at its housing body 18 to the vibrative member (not shown), by a mounting bold (not shown) screwed in the threaded hole 54.

The cover member 20 is a disk-like shaped member, and includes an annular shaped fitting protrusion 56. The cover member 20 is placed on and fixed to the upper end face of the housing body 18, with its fitting protrusion 56 being press-fitted into the opening of the annular groove 52. Therefore, the cover member 20 closes opening of the annular groove 52 and cooperate with the annular groove 52 to define therebetween the interior space 12 as an accommodation space, which space 12 extending in the circumferential direction about an axis 58 of the housing body 18 with a substantially constant rectangular cross sectional shape over its entire circumference.

The independent mass member 16 includes a pair of metallic masses 60, 60 as a mass body and the rubber elastic body layer 28. The pair of metallic masses 60, 60 have a generally semi-cylindrical shape and are disposed in respective circumferential portions of the mass member 16 that are opposed to each other in a diametric direction of the mass member 16, such that the opposite circumferential end faces of the one metallic mass 60 are opposed to the respective opposite circumferential end faces of the other metallic mass 60 in the circumferential direction with a given circumferential spacing therebetween. The rubber elastic body layer 28 is formed on and secured to the entire surfaces of the metallic masses 60, 60, so that the metallic masses 60, 60 are entirely embedded in and covered with the rubber elastic body layer 28. The metallic masses 60, 60 are formed of a metallic material such as steel by pressing, for example.

The rubber elastic body layer 28 is a thick-walled hollow cylindrical member, which extends in the circumferential direction about the axis 58 of the housing body 18 with a substantially constant rectangular cross sectional shape over its entire circumference. In the radially intermediate portion of the rubber elastic body layer 28, there are embedded the pair of the metallic masses 60, 60 such that the metallic masses 60, 60 are disposed in respective circumferential portions of the radially intermediate portion of the rubber elastic body layer 28 that are opposed to each other in a diametric direction of the rubber elastic body layer 28, so as to extend in the axial and circumferential directions. Thus, there is provided the independent mass member 16 including the elastic body member 28 and the pair of metallic masses 60, 60 embedded in the rubber elastic body layer 28. The independent mass member 16 has an inner diameter which is larger than the diameter of the center-shaft portion 48 and an outer diameter which is smaller than the inner diameter of the outer wall portion 50 of the housing body 18. In the present embodiment, particularly, the difference: γ between the inner diameter of the mass member 16 and the diameter of the center-shaft portion 48 is made smaller than the difference: α between the outer diameter of the mass member 16 and the inner diameter of the outer wall portion 50. The axial length of the mass member 16 is made smaller than the axial length of the interior space 12 of the housing member 14.

The thus formed: independent mass member 16 is installed in the annular groove 52 of the housing body 18, and the opening of the annular groove 52 is covered by the cover member 20, whereby the mass member 16 is non-adhesively accommodated within the interior space 12 of the housing member 14. In this condition, the mass member 16 is not bonded to and independent of the housing member 14, permitting an independent movement or displacement of the mass member 16 relative to the housing member 14.

According to the vibration damper 44 of the fourth embodiment of the present invention, the mass member 16 is opposed to or spaced apart from the outer wall portion 50 of the housing body 18 with the gap distance: δ (α) therebetween in any radial directions, when the mass member 16 is held in a coaxial relationship with the center-shaft portion 48 and the outer wall portion 50. Thus, the vibration damping device 48 can exhibit an excellent damping effect with respect to vibrational loads applied in any radial directions, based on the impact and the sliding friction generated upon impact of the mass member 16 with the housing member 14.

In particularly, the cylindrical mass member 16 is formed by using the pair of semi-cylindrical metallic masses 60, 60 disposed in mutually spaced-apart relationship with each other, and by integrally bonding the semi-cylindrical metallic masses 60, 60 into a cylindrical shape with the rubber elastic body layer 28 interposed between metallic masses 60, 60. This arrangement facilitates formation of the cylindrical mass member 16 by using a semi-cylindrical metallic member which is easily formed by pressing. The presence of the rubber elastic body layer 28 makes it easy to assure an dimensional accuracy of the mass member 16 and a resultant dimensional accuracy of the gap distance δ between the mass member 16 and the housing member 14 in the radial direction, whereby the vibration damper 44 can exhibit a desired damping effect with high stability.

Figure 7:
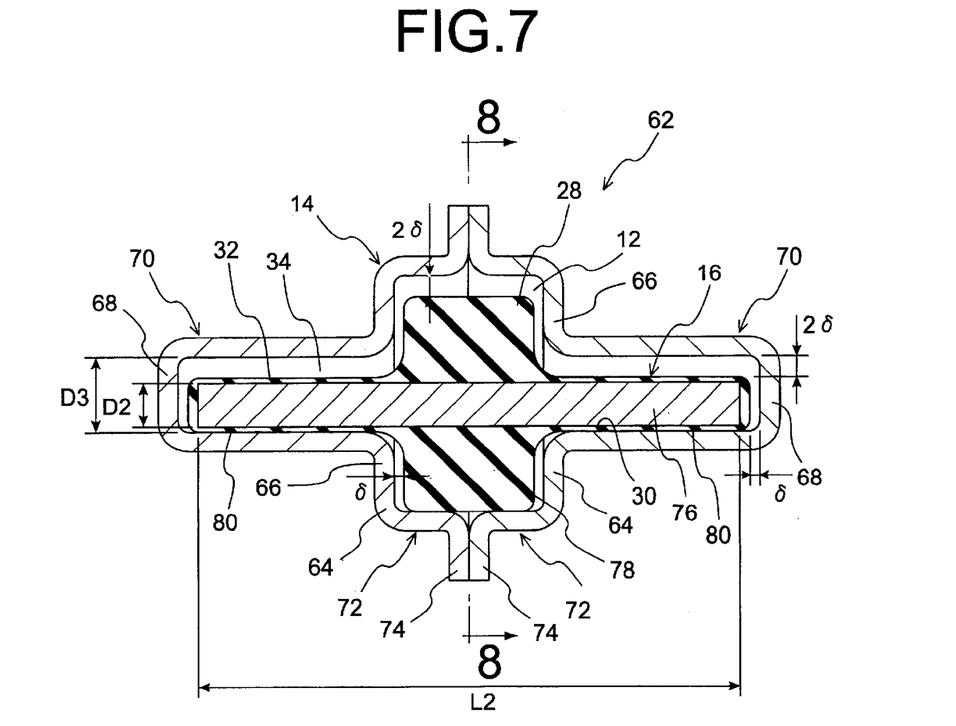
FIG. 7 is an elevational view in transverse cross section of a vibration damper for automotive vehicles, constructed according to a fifth embodiment of the present invention.
Figure 8:
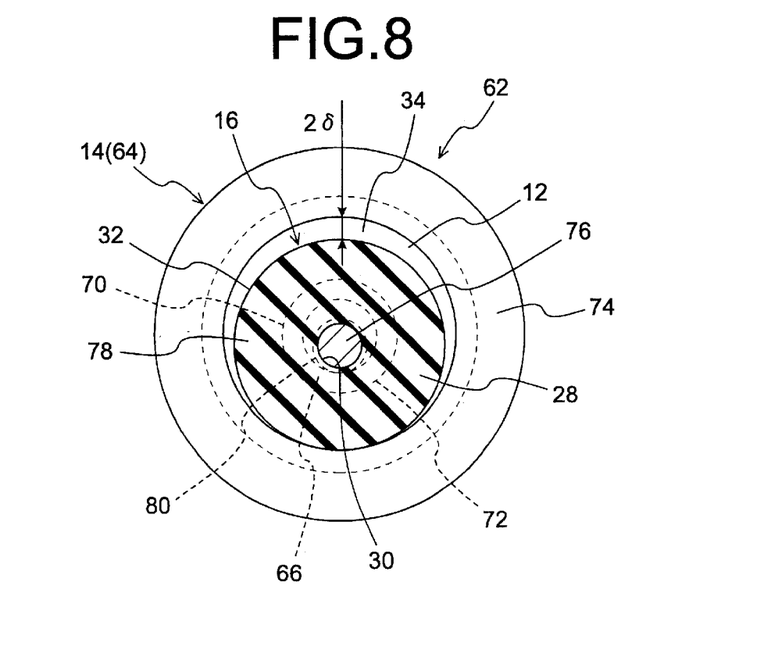
FIG. 8 is a cross sectional view taken along line 8—8 of FIG. 7.

Referring next to FIGS. 7 and 8, there is shown a vibration damper 62 for an automotive vehicle, constructed according to a fifth embodiment of the present invention. The vibration damper 62 includes a housing member 14 having a hollow interior space 12 and an independent mass member 16 accommodated within the interior space 12. The vibration damper 62 is installed in the vehicle such that the housing member 14 is firmly fixed to a vibrative member of the vehicle.

Described more specifically, in the present embodiment, the housing member 14 includes, a pair of housing halves 64, 64 each having a stepped cylindrical shape. The each housing half 64 may be formed by a deep drawing operation performed on a rigid or metallic plate, such as an iron plate. The each housing half 64 includes an axially intermediate shoulder portion 66, and a small-diameter portion 70 located on the lower side of the shoulder portion 66 (i.e., on the side of the bottom wall portion 68 thereof), and a large-diameter portion 72 located on the upper side of the shoulder portion 66 (i.e., on the side of the open end portion thereof). The each housing half 64 further includes an outward flange portion 74 integrally formed at the open-end face of the large diameter portion 72 so as to extend radially outwardly. The thus formed pair of housing halves 64, 64 are opposed to each other at their open end portions in the horizontal direction as viewed in FIG. 7 and are firmly butted together at their outward flange portions 74, 74 such that the outward flange portions 74, 74 of the housing halves 64, 64 are superposed on each other and welded together. Thus, the open-end portions of the housing halves 64, 64 are tightly closed with each other, thereby providing the stepped cylindrical shaped housing member 14 in which the interior space.12 is enclosed.

The mass member 16 includes a metallic mass 76 as a mass body and the rubber elastic body layer 28 as an elastic body layer. The metallic mass 76 is a solid cylindrical rod member extending straightly with a circular cross sectional shape which is substantially constant over its longitudinal length. The metallic mass 76 has a diameter: D2 which is smaller than the inner diameter:D3 of the smaller diameter portions 70, 70 of the housing halves 64, 64, and an axial length:L2 which is smaller than that of the interior space 12 of the housing member 14. The rubber elastic body layer 28 is formed on and bonded to the entire surface of the metallic mass 76, so as to cover the entire surface of the metallic mass 76. The rubber elastic body layer 28 has an outside configuration which is made similar to and slightly smaller than the configuration of the interior space 12 defined by the inner surface of the housing halves 64, 64. That is, the rubber elastic body layer 28 is a stepped cylindrical member including an axially intermediate large diameter portion 78 and axially opposite small diameter portions 80, 80 which are spaced apart from each other in the axial direction with the large-diameter portion 78 therebetween.

The thus constructed mass member 16 is inserted at its small-diameter portions 80, 80 into the small-diameter portions 70, 70 of the housing halves 64, 64, respectively. In this condition, the housing halves 64, 64 are butted and welded together at the outward flange portions 74, 74, whereby the mass member 16 is accommodated within the interior space 12 of the housing member 14, such that the mass member 16 is independent of and is not bonded to the interior space 12 of the housing member 14. Therefore, the independent mass member 16 is independently movable relative to the housing member 14. That is, the mass member 16 can be spaced apart from the housing member 14 with the spacing 34 therebetween. Namely, with the mass member 16 being located in the central portion of the interior space 12, the outer surface of the mass member 16 and the inner surface of the housing member 14 are spaced apart from each other with the gap distance: δ (i.e., a half of the distance:2 δ of the spacing 34) herebetween, over their entire surfaces.

In the static state of the vibration damper 62 shown in FIGS. 7 and 8, where the housing member 14 is not subjected to the vibration of the vibrative body, the independent mass member 16 is held in contact with the lower surface of the interior space 12 due to gravity acted thereto, and are spaced apart from the upper surface of the interior surface 12 with the predetermined spacing 34 having the distance of 2 δ therebetween. In the present embodiment, the distance:2 δ of the spacing 34 is held within a range of 0.1–1.6 mm.

In the vibration, damper 62 constructed as described above, the mass member 16 is accommodated within the interior space 12 such that the mass member 16 is opposed to the housing member 14 in the axial direction and in the direction perpendicular to the axial direction (or the radial direction), with a given spacing: δ (i.e., a half of 2 δ) therebetween. Thus, the vibration damper 62 can exhibit an excellent damping effect with respect to vibrations applied thereto in the axial and radial directions, based on the effects of impact of the mass member 16 with the housing member 14.

Figure 9:
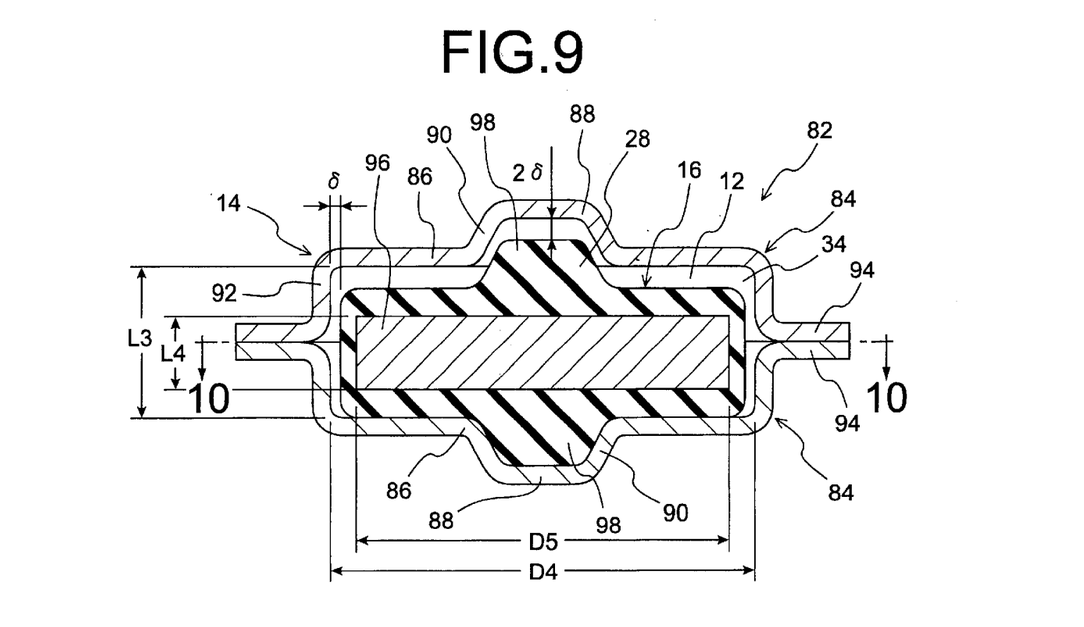
FIG. 9 is an elevational view in transverse cross section of a vibration damper for automotive vehicles, constructed according to a sixth embodiment of the present invention.
Figure 10:
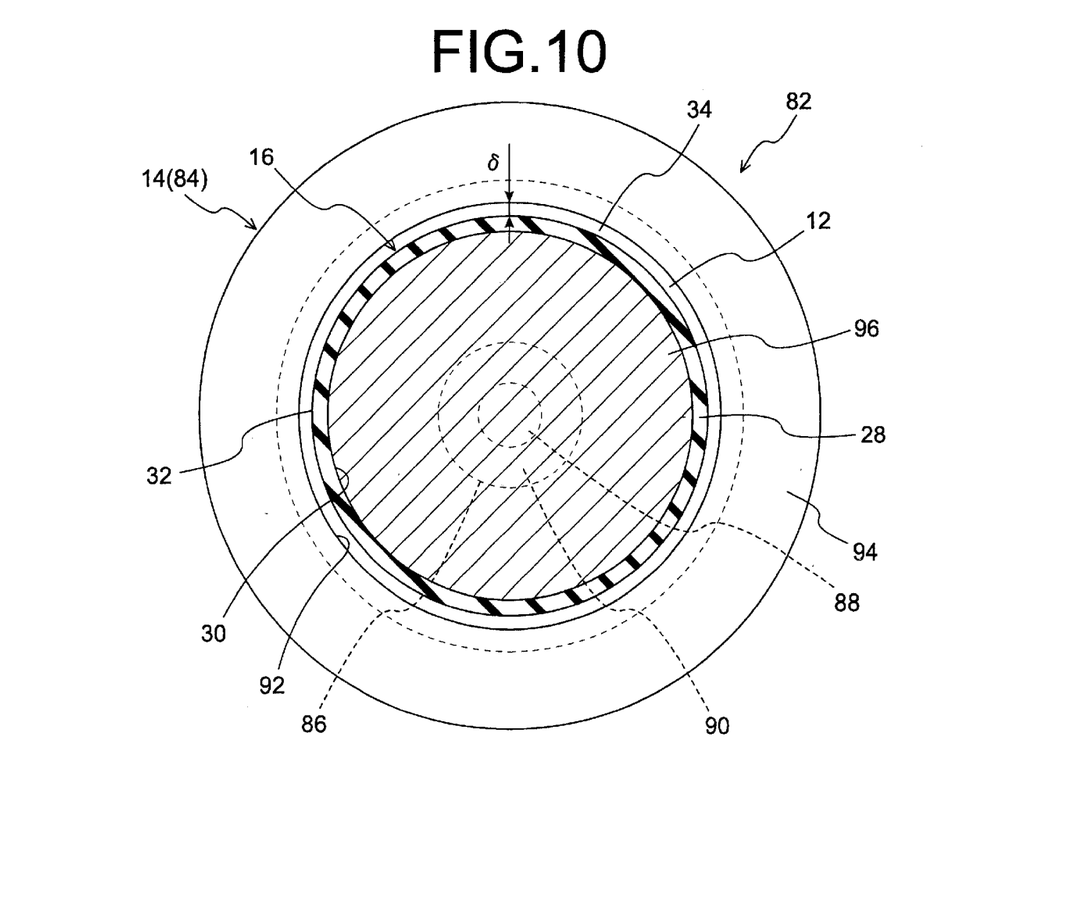
FIG. 10 is an cross sectional view taken along line 10—10 of FIG. 9.

Referring next to FIGS. 9 and 10, there is illustrated a vibration damper 82 for an automotive vehicle, constructed according to the sixth embodiment of the present invention. The vibration damper 82 includes a housing member 14 having a hollow interior space 12 and a mass member 16 accommodated within the interior space 12. The vibration damper 82 is installed in the vehicle such that the housing member 14 is firmly fixed to a vibrative member of the vehicle.

Described more specifically, the housing member 14 includes a pair of housing halves 84, 84 each having a stepped cylindrical shape. Like in the fifth embodiment, the each housing half 84 may be formed by a deep drawing operation performed on a rigid or metallic plate, such as an iron plate. The each housing half 84 includes an axially intermediate shoulder portion 86, and a tapered small-diameter portion 90 located on the axially lower side of the shoulder portion 66 (i.e., on the side of the bottom wall portion 88 thereof), and a large-diameter portion 92 located on the axially upper side of the shoulder portion 86 (i.e., on the side of the open end portion thereof). The each housing half 84 further includes an outward flange portion 94 integrally formed at the open-end face of the large diameter portion 92 so as to extend radially outwardly. The thus formed pair of housing halves 94, 94 are opposed to each other at their open end portions in the vertical direction as viewed in FIG. 9 and are firmly butted together at their outward flange portions 94, 94 such that the outward flange portions 94, 94 of the housing halves 84, 84 are superposed on each other and welded together. Thus, the open-end portions of the housing halves 84, 84 are tightly closed with each other, thereby providing the stepped cylindrical shaped housing member 14 in which an interior space 12 is enclosed.

The mass member 16 includes a metallic mass 96 as a mass body and a rubber elastic body layer 28 as an elastic body layer. The metallic mass 96 is a disk-shaped member which has a diameter: D5 which is smaller than the inner diameter: D4 of the large diameter portions 92, 92 of the mold halves 84, 84, and a wall thickness: L4 which is smaller than a thickness: L3 of the interior space 12, that is, the gap distance between the stepped portions 86, 86 opposed to each other in the axial direction of the housing member 14. The rubber elastic body layer 28 is formed on and bonded to the entire surface of the metallic mass 96, so as to cover the entire surface of the metallic mass 96. The rubber elastic body layer 28 has an outside configuration which is made similar to and slightly smaller than the configuration of the interior space 12 defined by the inner surface of the housing halves 84, 84. That is, the rubber elastic body layer 28 is a stepped cylindrical member including a frusto-conical shaped protruding portions 98, 98 which are integrally formed on and protrude axially outwardly from the central portions of the axially opposite end faces of the rubber elastic body layer 28, respectively. That is, the protruding portions 98, 98 have a diameter which is decreased in the axially outward directions.

The thus constructed mass member 16 is inserted at its protruding portions 98, 98 into the tapered small-diameter portions 90, 90 of the housing halves 84, 84, respectively. In this condition, the housing halves 84, 84 are butted and welded together at the outward flange portions 94, 94, whereby the mass member 16 is accommodated within the interior space 12 of the housing member 14, such that the mass member 16 is independent of and is not bonded to the interior space 12 of the housing member 14. Therefore, the independent mass member 16 is independently movable relative to the housing member 14. That is, the mass member 16 is spaced apart from the housing member 14 with the spacing 34 therebetween. Namely, with the mass member 16 being located in the central portion of the interior space 12, the outer surface of the mass member 16 and the inner surface of the housing member 14 are spaced apart from each other with the gap distance: δ (i.e., a half of the distance:2 δ of the spacing 34) therebetween, over their entire surfaces.

In the static state of the vibration damper 62 shown in FIGS. 9 and 10, where the housing member 14 is not subjected to the vibration of the vibrative body, the independent mass member 16 is held in contact with the lower surface of the interior space 12 due to gravity acted thereto, and are spaced apart from the upper surface of the interior surface 12 with the predetermined spacing 34 having the distance of 2 δ therebetween. In the present embodiment, the distance:2 δ of the spacing 34 is held within a range of 0.1–1.6 mm.

In the vibration damper 82 constructed as described above, the mass member 16 is accommodated within the interior space 12 such that the mass member 16 is opposed to the housing member 14 in the axial direction and in the direction perpendicular to the axial direction (or the radial direction) with the gap distance: δ (i.e., a half of 2 δ) therebetween. Thus, the vibration damper 62 can exhibit an excellent damping effect with respect to vibrations applied thereto in the axial and radial directions, based on the effects of impact of the mass member 16 with the housing member 14.

Figure 11:
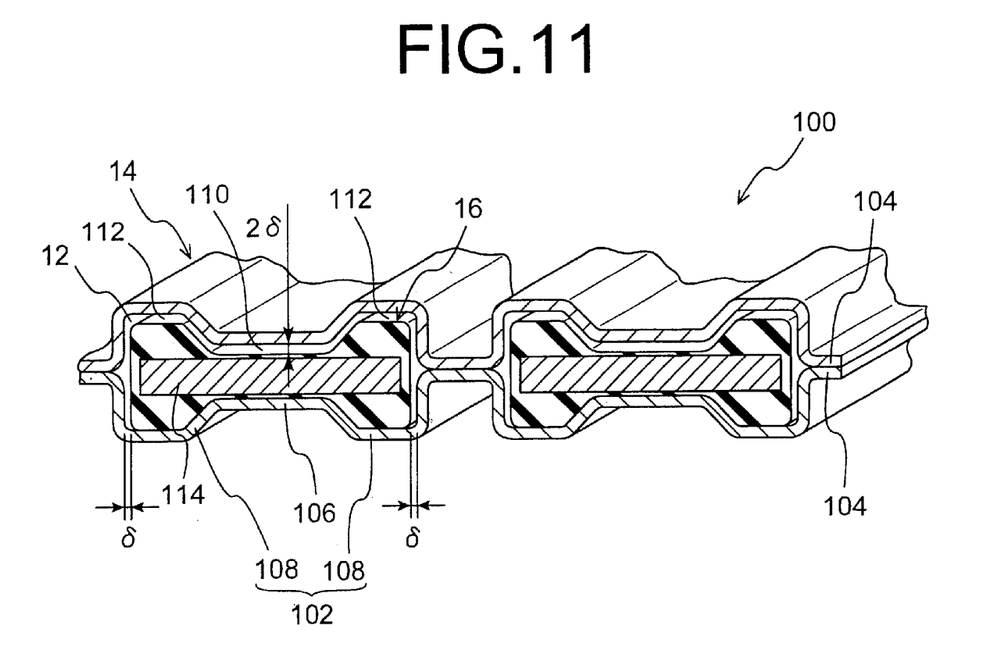
FIG. 11 is a perspective view in transverse cross section of a vibration damper for automotive vehicles, constructed according to a seventh embodiment of the present invention.

Referring next to FIG. 11, there is shown a vibration damper 100 constructed according to the present embodiment, wherein the present invention is applied to a supporting plate used as a floor panel of an automotive vehicles. Namely, the present vibration damper 100 includes a housing member 14 in the form of a floor structure as a vibrative member, which has a plurality of hollow interior spaces 12 formed therein at regular intervals. The vibration damper 100 also includes a plurality of mass members 16 accommodated within the plurality of interior spaces 12, respectively.

Described more specifically, the housing member 14 includes a pair of plates 104, 104 each having a plurality of generally rectangular grooves extending in its longitudinal direction and arranged at regular intervals in its width direction. The pair of plates 104, 104 are opposed to and superposed on each other at their ones of opposite major surfaces in which the grooves are opened, thereby providing the housing member 14 having the plurality of interior spaces 12 defined by the opposite grooves 102, 102, which extend parallel to each other in the longitudinal direction of the housing member 14 and are arranged in the width direction of the housing member 14 at regular intervals. As is apparent from FIG. 11, each groove 102 includes a shallow bottom-wall portion 106 located in an intermediate portion of the groove 102 in its width direction, and a deep bottom-wall portions 108, 108 located in opposite sides of the shallow bottom-wall portion 106 in its width direction. Therefore, each interior space 12 defined between the opposite grooves 102, 102 includes a thin-walled portion 110 defined between the opposite shallow bottom portions 106, 106, and a thick-walled portions 112, 112 defined between the respective opposite deep bottom-walled portions 108, 108. The pair of plates 104, 104 may be made of a rigid material such as iron, and may be formed by a pressing operation performed on an iron plate, for example.

Each of the plurality of independent mass members 16 includes a flat-plate shaped metallic mass 114 as a mass body, having a rectangular cross sectional shape which is constant over its longitudinal direction. The metallic mass 114 is formed by pressing of a metallic material such as steel. The rubber elastic body layer 28 is formed on and bonded to the entire surface of the metallic mass 114, so that the metallic mass 114 is covered by and embedded in the rubber elastic body layer 28. The rubber elastic body layer 28 has an outside configuration which is made similar to and slightly smaller than the configuration of the interior space 12, like in the aforementioned embodiments. The thus constructed independent mass members 16 are accommodated in the interior spaces 12, respectively.

In the vibration damper 100 constructed according to the present embodiment, each of the mass members 16 is disposed in the corresponding interior space 12 such that the mass member 16 is independent of and does not bonded to the interior space 12 of the housing member 14. Therefore, the independent mass member 16 is independently movable relative to the housing member 14. That is, the mass member 16 can be spaced apart from the housing member 14 with the spacing 34 therebetween. Namely, with the mass member 16 being located in the central portion of the interior space 12, the outer surface of the mass member 16 and the inner surface of the housing member 14 are opposed to and spaced apart from each other with the gap distance: $\delta$ therebetween, over their entire surfaces.

In the static state of the vibration damper 62 shown in FIG. 11, where the housing member 14 is not subjected to the vibration of the vibrative body, the independent mass member 16 is held in contact with the lower surface of the interior space 12 due to gravity acted thereto, and are spaced apart from the upper surface of the interior surface 12 with the predetermined spacing 34 having the distance of 2 $\delta$ therebetween. In the present embodiment, the distance:2 $\delta$ of the spacing 34 is held within a range of 0.1–1.6 mm.

In the vibration damper 100 constructed as described above, the mass member 16 is accommodated within the interior space 12 such that the mass member 16 is opposed to the housing member 14 in the wall-thickness direction and in the direction perpendicular to the longitudinal direction (or the width direction), with a given spacing: $\delta$ (i.e., a half of 2 $\delta$) therebetween. Thus, the vibration damper 62 can exhibit an excellent damping effect with respect to vibrations applied thereto in the wall-thickness and width directions, based on the effects of impact of the mass member 16 with the housing member 14.

Figure 12:
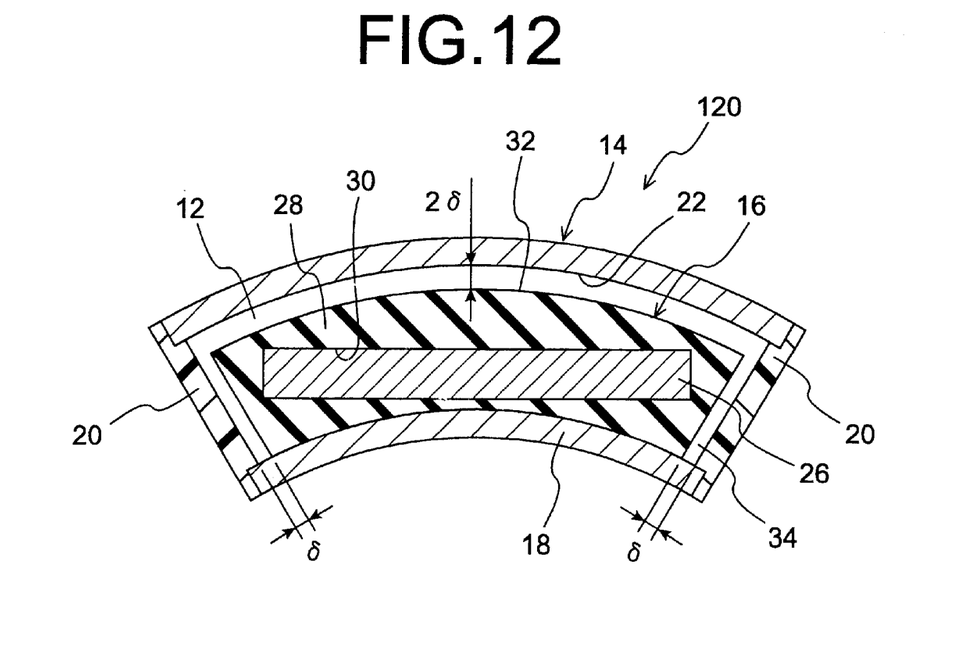
FIG. 12 is an elevational view in longitudinal cross section of a vibration damper for automotive vehicles, constructed according to a eighth embodiment of the present invention.

Referring next to FIG. 12, there is illustrated a vibration damper 120 for an automotive vehicle, constructed according to the eighth embodiment of the present invention. The vibration damper 120 includes a housing member 14 which is formed by bending the housing member 14 used in the first embodiment into a curved member. The housing member 14 has a curved interior space 12 in which the independent mass member 16 is accommodated. It is noted that the vibration damper 120 of the present embodiment is preferably applicable to a vibrative member having a curved mounting portion, for example.

The independent mass member 16 includes the metallic mass 26 in the form of a solid cylindrical rod member, and the rubber elastic body layer 28 whose outside configuration is made similar to and slightly smaller than the configuration of the interior space 12.

The thus constructed independent mass member 16 is inserted into the bore 22 of the housing body 18, and the cover members 20, 20 is fixed to and cover the axially opposite openings of the housing body 18, whereby the independent mass member 16 is accommodated within the interior space 12 of the housing member 14. In this condition, the mass member 16 is independent of and does not bonded to the interior space 12 of the housing member 14. Therefore, the independent mass member 16 is independently movable relative to the housing member 14.

In the thus constructed vibration damper 120, the outer surface of the mass member 16 and the inner surface of the housing member 14 are spaced apart from each other with the given distance $\delta$ therebetween, over their entire surfaces, with the mass member 16 being located in the central portion of the interior space 12. In the static state of the vibration damper 120 shown in FIG. 12, where the housing member 14 is not subjected to the vibration of the vibrative body, the independent mass member 16 is held in contact with the lower surface of the interior space 12 due to gravity acted thereto, and are spaced apart from the upper surface of the interior surface 12 with the predetermined spacing 34 having the gap distance of 2 $\delta$ therebetween. The mass member 16 is opposed to the housing member 14 in the direction perpendicular to the center axis of damper 120 extending in the longitudinal direction, with a given spacing: $\delta$ (i.e., a half of 2 $\delta$) therebetween. Thus, the vibration damper 120 can exhibit an excellent damping effect with respect to vibrations applied thereto in the direction perpendicular to the center axis of the damper 120, based on the effects of impact of the mass member 16 with the housing member 14.

As is apparent from the foregoing explanation, the vibration damper of the present invention is arranged such that (a) the independent mass member 16 is formed independently of the housing member 14 and enclosed: within the interior space 12 of the housing member 14 with a predetermined gap therebetween, so as to allow a free displacement of the independent mass member 16 within the interior space 12, (b) the independent mass member 1G and the housing member 14 are elastically impacted against each other, at their abutting surfaces and (c) the housing member 14 has at least two abutting surfaces which are opposed to each other in a vibration input direction with the independent mass member 16 therebetween, and the independent mass member 16 is opposed at least two abutting surfaces thereof to the at least two abutting surfaces of the housing member, with a slight gap distance therebetween, respectively. In this arrangement, a velocity of the relative displacement between the independent mass member 16 and the housing member 14 can be suitably adjusted, permitting control of condition and energy of impact between the independent mass member 16 and the housing member 14. With this advantage of the present invention, i.e., the control of the condition and energy of impact between the independent mass member 16 and the housing member 14, the vibration damper of the present invention can exhibit an excellent vibration damping effect with respect to vibrations over a wide frequency range, i.e., ranging from at around 10 Hz to 100 Hz or more:, which vibrations are prone to be excited in an automotive vehicle. That is, the vibration damper of the present invention is simple in structure and can exhibit a significantly improved damping effect with respect to the vibrations excited in the vehicle, by only adjusting the gap distance $\delta$ between the abutting surface of the independent mass member 16 and the abutting surface of the housing member 14, and properties of the adjusting surfaces. It should be noted that conventional vibration damper for vehicles cannot achieve the damping effect of the present vibration damper.

While the presently preferred embodiments of the invention have been described above in detail for illustrative purpose only, it is to be understood that the invention is not limited to the details of these illustrated embodiments, but may be modified with various changes, modifications and improvements.

For instance, the housing member is not particularly limited to a rigid-case member independent of and firmly fixed to the vibrative member. For instance, the housing member may be constituted by utilizing a hollow structural portion of the vibrative member, or alternatively by partially utilizing the vibrative member.

In the first embodiment, the rubber elastic body layer 34 is brought into impact against the housing member at an entire surface of its abutting surfaces.: This arrangement is not essential to practice the present invention. The mass member 16 may be arranged to impact the housing member at its longitudinally opposite end portions, for example.

In the illustrated embodiments, the rubber elastic body layer is formed of the rubber elastic body. The rubber elastic body layer may be formable by a synthetic resin material, or alternatively by a foamed body made of a rubber material or a synthetic resin material.

When the plurality of mass members may be used as in the second, third, fourth and seventh embodiments, the mass members may vary in terms of their mass so as to tune the mass members differently from each other.

For assuring a desirably minimized impact noise, it is preferable that the independent mass member and the housing member are opposed to each other with a gap distance within a range of 0.05–0.8 mm therebetween, over their entire opposite surfaces. However, the independent mass member and the housing member may be spaced apart from each other with a spacing of 0.8 mm or more therebetween, at their opposite surfaces which are opposed to each other in the direction in which the vibrational load is not applied.

While the present invention is applied to the vibration damper for an automotive vehicle, in the illustrated embodiments, the present invention is suitably applicable to the other vibration dampers used for the other kinds of vehicles and various kinds of devices other than the vehicles.

It is to be understood that the present invention may be embodied with various other changes, modifications, and improvement which may occur to those skilled in the art, without departing from the spirit and scope of the invention defined in the following claims

What is claimed is:

1. A vibration damping device for damping vibrations of a vibrative member of a vehicle, comprising:

a rigid housing member having an accommodation space, which is fixedly disposed in the vibrative member; and an independent mass member including a rigid mass body and an elastic body layer formed on and bonded to an outer surface of said rigid mass body, said outer surface of said rigid mass body having a configuration different from a configuration of an inner surface of said housing member which defines said accommodation space, said independent mass member being non-adhesively disposed in said accommodation space such that an outer surface of said independent mass member is opposed to said inner surface of said housing member with a predetermined gap distance therebetween, to thereby permit displacement of said independent mass member relative to said housing member, said independent mass member and said housing member being brought into elastic impact against each other, upon application of a vibrational load, at respective abutting surfaces thereof which are opposed to each other in a direction in which said vibrational load is applied, said elastic body layer of said independent mass member having a wall thickness which is partially varied so that said abutting surface of said independent mass member has a configuration corresponding to a configuration of said abutting surface of said housing member.

2. A vibration damping device according to claim 1, wherein said elastic body layer has a Shore D hardness of 80 or lower, as measured in accordance with ASTM method D-2240.

3. A vibration-damping device according to claim 1, wherein said elastic body layer has a Shore D hardness within a range of 20–40, as measured in accordance with ASTM method D-2240.

4. A vibration damping device according to claim 1, wherein said gap distance between said abutting surface of said independent mass member and said abutting surface of said housing member is held within a range of 0.05–0.8 mm, and said independent mass member may be reciprocally movable by a distance of 0.1–1.6 mm between at least two abutting surfaces of the housing member which are opposed to each other with the independent mass member therebetween in said direction in which the vibrational load is applied to the vibration damping device.

5. A vibration-damping device according to claim 1, wherein a total mass of said rigid mass body and said elastic body layer is held within a range of 5–10% of a mass of the vibrative member.

6. A vibration damping device according to claim 1, wherein said housing member is formed of a rigid material having a modulus of elasticity of $5 \times 10^4$ MPa or more.

7. A vibration-damping device according to claim 1, wherein said elastic body layer have a modulus of elasticity within a range of $1-10^4$ MPa.

8. A vibration-damping device according to claim 1, wherein said elastic body layer has a loss tangent of not less than $10^{-3}$.

* * * * *

UNITED STATES PATENT AND TRADEMARK OFFICE
CERTIFICATE OF CORRECTION

PATENT NO.    : 6,494,444 B2
DATED         : December 17, 2002
INVENTOR(S)   : Hasegawa It is certified that error appears in the above-identified patent and that said Letters Patent is hereby corrected as shown below:

Column 3,
Line 40, delete "preferably".

Column 6,
Line 24, change "hosing" to -- housing --.
Line 24, change "define" to -- defines --.
Line 36, delete "preferably".

Column 9,
Line 2, change "two" to -- three --.
Line 12, insert after "housing member" -- 14 --.

Column 10,
Line 55, change "smaller" to -- larger --.

Column 13,
Line 7, change "66" to -- 86 --.
Line 12, change "large diameter" to -- large-diameter --.
Line 14, change "94,94" to -- 84,84 --.
Line 66, change "62" to --82 --.

Column 14,
Line 45, delete "a" after "and".

Column 15,
Line 6, change "does" to -- is --.

UNITED STATES PATENT AND TRADEMARK OFFICE
CERTIFICATE OF CORRECTION

PATENT NO. : 6,494,444 B2
DATED : December 17, 2002
INVENTOR(S) : Hasegawa It is certified that error appears in the above-identified patent and that said Letters Patent is hereby corrected as shown below:

Column 16,
Line 30, delete "the" after "thereof to".
Line 66, change "34" to -- 28 --.

Signed and Sealed this

Twenty-second Day of April, 2003

JAMES E. ROGAN
*Director of the United States Patent and Trademark Office*